Sept. 22, 1964 P. A. ILMONI 3,149,734
CONVEYING APPARATUS FOR CHARGING PELLET INDURATING FURNACES
Filed Oct. 2, 1961 2 Sheets-Sheet 1
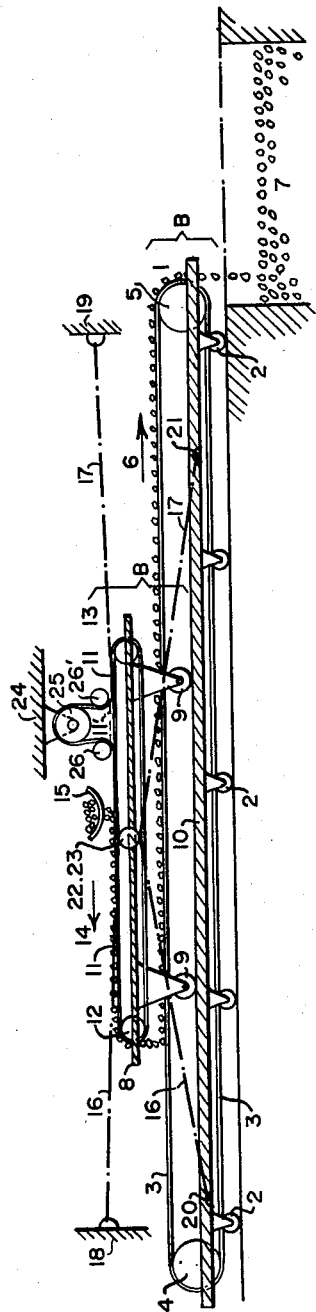
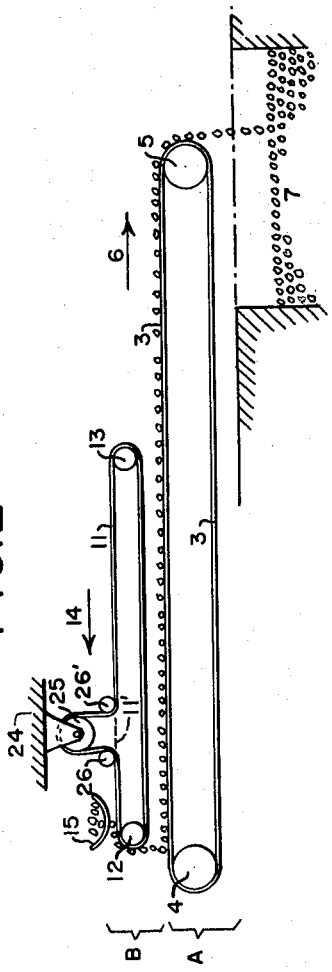
INVENTOR
PEHR ADRIAN ILMONI
BY Pierce, Scheffler & Parker
his ATTORNEYS

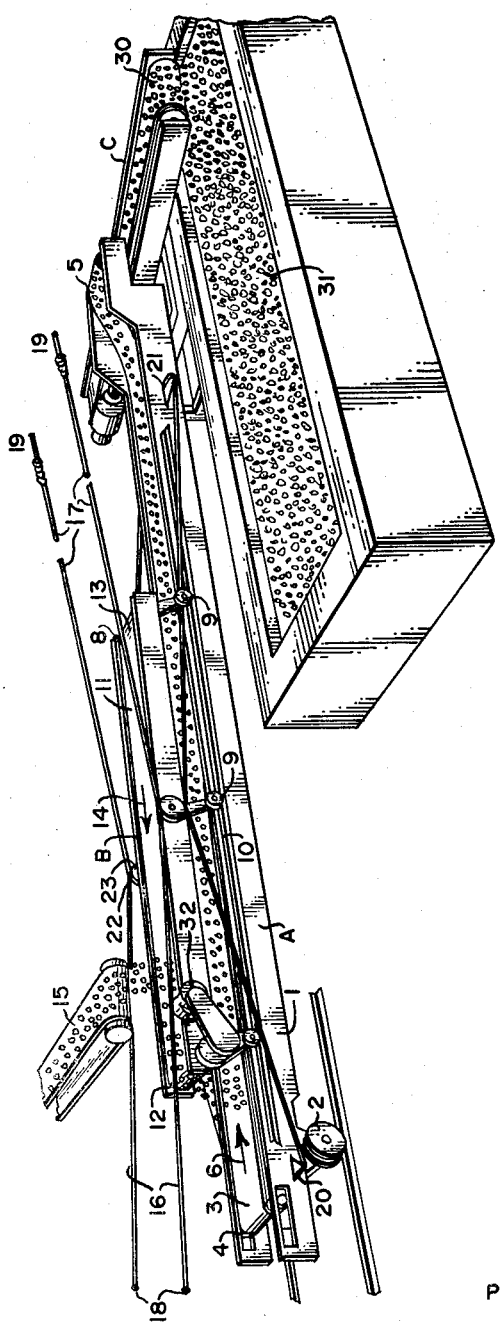

the invention resides in a belt con-
United States Patent Office 3,149,734
Patented Sept. 22, 1964

3,149,734
CONVEYING APPARATUS FOR CHARGING
PELLET INDURATING FURNACES
Pehr Adrian Ilmoni, Strassa, Sweden, assignor to Erie
Mining Company, a corporation of Minnesota
Filed Oct. 2, 1961, Ser. No. 142,408
5 Claims. (Cl. 214—18)

The present invention relates to an apparatus for feeding particulate material to a material deposition location, more especially to the charge opening of a shaft-type furnace for indurating pellets of iron ore and the like, at which charge opening the material is to be delivered with even distribution over a certain area of charge column resident in the furnace.

It heretofore has been proposed, in conveying material to an area to which the material is to be delivered, to arrange a belt conveyor which as a unit is movable in its longitudinal direction with the conveyor belt moving below an intake for the material, for instance the delivery end of a supply conveyor, the discharge end of said belt conveyor being movable back and forth above the area over which the material is to be spread while being discharged from the conveyor, if necessary by the intermediary of a further conveyor, which is also as a unit movable perpendicularly to, and below, the discharge end of the first mentioned conveyor, the discharge end of the further conveyor thus scanning the area over which the material is to be spread.

Furthermore, it belongs to prior knowledge, in order to attain a more even distribution of the material than that obtained when using constant speed of the belts of the conveyors, to apply to two conveyor belts, arranged in succession after each other, a speed relative to the points at which the material is fed from one conveyor belt to a following one which varies with the translation speed of the conveyor units.

A constant quantity of material per unit of length of the conveyor belt or belts does not, however, necessarily imply that the material conveyed by the conveyor apparatus is being discharged from the apparatus at a constant rate, this owing to the fact that the distance over which the material is being conveyed from the entrance of the material to the conveyor apparatus to the discharge end thereof will vary in dependence on the movements of the conveyor units. If a conveyor unit—and, thus, its individual discharge end—moves in a direction opposite to the transport direction of the conveyor belt carrying the material and, at the same time, the belt speed is being adapted so as to make the quantity of material per unit of length of the belt constant, the rate of discharge of the material at the end of the belt will be greater than average, and if the conveyor unit moves in the same direction as the belt, the rate of discharge will be smaller than average, that is to say, the rate at which the material is fed to the conveying apparatus. Thus the discharge rate at the exit end of the conveyor will vary with the movement of conveyor units of the apparatus, this disadvantage being further accentuated by the fact that an increase or a decrease of the discharge rate will always appear at one and the same point of the area over which the material is being spread thereby compounding the variation in height of the deposit at such point.

If high demands are put on the accuracy of the discharge rate at each point of the discharge area, an apparatus of the kind above described, with which the quantity of material is thus constant as calculated per length unit of conveyor belt, brings considerable inconveniences. In order to eliminate these inconveniences it had earlier been proposed to arrange two conveyor units in succession after each other, one of said conveyors being arranged so as to swing horizontally about a pivot with its entrance end below an inlet to the conveyor of the material to be conveyed, while the second conveyor is arranged in a similar manner to be swung about a pivot at the end of said first conveyor and with its discharge end movable above the area over which the material is to be spread. The total distance of transport, as well as the amount of material per length unit of conveyor, is thus always constant wherefore the discharge rate at the discharge end of the conveyor apparatus will also be constant. A conveyor apparatus of this type involves, however, obvious mechanical complications and requires a large base area for the swinging conveyor units.

An object of the present invention is to eliminate the described inconveniences of conveying apparatus while obtaining a constant or essentially constant rate of discharge. The invention thus relates to a conveying apparatus comprising at least one belt conveyor unit for feeding material to and evenly distributing it over an area, for instance the charge opening of an indurating furnace, with which the rate of material discharged at the movable exit end of the conveyor unit is constant or essentially constant.

For this purpose, the invention resides in a belt conveyor apparatus comprising, in combination, a first belt conveyor unit, hereinafter called "main conveyor," which, as a unit, is movable back and forth in its longitudinal direction, defined as the direction of movement of its conveying belt, and a second belt conveyor unit, said second belt conveyor unit being movably arranged above said main conveyor unit, the conveyor apparatus further comprising means for driving said second conveyor unit, as a unit, in the same direction as the direction of movement of said main conveyor unit and with half the velocity of said main conveyor unit, the second conveyor unit being arranged so as to discharge the material conveyed thereby onto the conveyor belt of the main conveyor unit. The conveyor belt of said second conveyor unit may, for reasons more fully described below, be driven at a speed which is constant relative to the supporting structure of the second conveyor unit, for instance a carriage, but preferably—and in particular where the demands of accuracy as regards discharge rate at the exit end of the conveyor apparatus are high—is arranged so as to be driven at a constant speed relative to the point at which the material is fed to the conveyor. The conveyor belt of the second conveyor unit is arranged so as to be driven in the opposite direction to the conveyor belt of the main conveyor unit. As will be evident, this arrangement of the conveyor units will imply a constant transport distance from the intake, i.e., the point at which the material is fed to the conveying apparatus, via the unloading end of the second conveyor unit to the unloading end of the main conveyor unit.

Provided that the conveyor belt of the second conveyor unit is driven at constant speed relative to the intake point at which the material is fed to the conveyor apparatus, an even discharge of material is obtained from the end of the main conveyor unit. However, even if the conveyor belt of the second conveyor is being driven at a constant speed relative to its carriage, that is to say, at a varying velocity past the intake point, the variations in the quantity of material deposited per unit length of belt will be very small, this being due to the fact that the second conveyor unit in its reciprocating movement relative to the point at which the material is fed to the conveyor moves at only half the velocity of the main conveyor unit in the longitudinal direction.

The invention will be made evident by the following description of an embodiment of an apparatus according to the invention illustrated in the accompanying drawings, in which:

FIG. 1 and FIG. 2 diagrammatically show a conveying apparatus for conveying material in one single direction, in which apparatus the conveyor belt of the second conveyor unit is driven at a constant speed in relation to the material intake by a roller the support of which is arranged stationary; and FIG. 3 illustrates a device in which the conveyor belt of the second conveyor unit is driven at a speed independent of the movement of the conveyor as a unit in its longitudinal direction, the device according to FIG. 3 further being provided with a discharge conveyor movable as a unit in a direction perpendicular to the longitudinal direction of the main conveyor unit.

In the arrangement according to FIG. 1, a main conveyor unit A comprises a carriage 1, which is movable on a support and, for this purpose, is provided with wheels 2. The conveyor belt 3 of the main conveyor unit, which is arranged so as to be driven in a conventional manner by driving means not illustrated in the drawing, runs over rollers of which only end rollers 4 and 5 at the ends of the conveyor unit are illustrated in the drawing. The discharge from the conveyor unit is located at the roller 5, the conveyor belt thus being movable in the direction indicated by arrow 6. The material conveyed by the main conveyor unit is fed to a discharge place 7, for instance, the mouth of an indurating furnace over the stockline of which the material is being distributed by the belt 3 with its discharge roller 5 moving back and forth above the discharge place 7.

A second conveyor unit B is movably arranged above the main conveyor unit A in the longitudinal direction of conveyor A. This second conveyor unit A comprises a carriage 8 which is movable above the conveyor unit A on wheels 9 which run on rails 10 on the main conveyor unit A. The carriage 8 may, however, also rest on wheels running on rails arranged independently of the conveyor unit A. The conveyor belt 11 of conveyor unit B runs via end rollers 12 and 13, the end roller 12 being the discharge end of the conveyor unit B, that is to say, the conveyor belt 11 of conveyor unit B moves in the direction indicated by arrow 14. The material to be fed to the discharge place 7 is fed to belt 11 of conveyor unit B at an intake 15 for the material and the material moves from this intake via the conveyor unit B to the end roller 12, where it is discharged onto the conveyor belt 3 of the main conveyor unit A.

Conveyor unit B is provided with driving means by which the carriage 8 of said conveyor unit is driven in the same direction as the carriage 1 of the main conveyor unit A. Said driving means are illustrated in FIG. 1 as consisting of two ropes 16 and 17, one end of each of which is stationarily secured at 18 and 19, respectively, and the other ends are secured to the carriage 1 of the main conveyor unit A at 20 and 21, respectively. Said ropes run via rope pulleys 22, 23, respectively, arranged on carriage 8. When the carriage 1 of the main conveyor unit A moves in one longitudinal direction or the other, the carriage 8 of the second conveyor unit B will thus be moved in the same direction although it attains a velocity which is one-half the velocity of the carriage 1.

In the embodiment illustrated in FIGS. 1 and 2, the conveyor belt 11 of the second conveyor unit B is driven from a driving roller 25, rotatably arranged on a stationary support 24, the belt 11 running over said roller 25 after having passed stationary supported rollers 26, 26', by which the belt is kept in a position so as to fit tightly to the driving roller 25 and is kept at a level chosen with due respect to the location of the intake 15 for the material and the end rollers 12 and 13 of carriage 8.

When driving the belt 11 with a constant velocity from a stationary supported driving roller, the velocity of the belt past the intake 15 will always be constant relative to said intake end independently of the movements of carriage 8 under the influence of the movement of carriage 1. The material will thus, provided that the feeding at the intake 15 is constant, have a constant rate per unit length of belt 11.

In FIG. 1 the device is shown in a position in which the discharge end of the main conveyor unit, that is to say the end roller 5, is located at the left end of the discharge place in the figure. The discharge end of the second conveyor unit, the end roller 12, will then be in its extreme left-hand position, to which it is brought together with carriage 8 by the rope 16. When carriage 1 moves from this position towards its other end position, in which the end roller 5 is located at the right side of the discharge place, the carriage 8 is drawn by the rope 17 in the same direction and with half the velocity of carriage 1. In this end position, the conveyor units are located as illustrated in FIG. 2.

Consequently, the path over which the material is being conveyed over the two conveyor belts remains constant from the intake 15 to the discharge at the end roller 5 independently of the movement of carriage 1, this being due to the fact that the length by which the conveying path is being increased on one of the conveyor belts is always the same by which the conveying path is being decreased on the other conveyor belt, and vice versa.

The conveyor belt 11 of the second conveyor B may, as indicated by the dashed line 11', be so arranged that it does not run via stationary supported rollers, the conveyor belt instead being driven at constant velocity in relation to the carriage 8 by a motor arranged on the carriage, as illustrated in FIG. 3 by motor 32.

FIG. 3 illustrates a device in which the discharge end of the main conveyor A is located at a carriage which carries a discharge conveyor unit C movably arranged perpendicularly to the conveying direction of the main conveyor unit A. The discharge conveyor unit C is, as a unit, arranged movable in its longitudinal direction, the discharge end of the conveyor unit located at an end roller 30 by means of reciprocating movements of the main conveyor unit A and of the conveyor unit C moving above a discharge surface 31. If the length of the path over which the conveyor unit C is to be movable is small as compared with the length of the path over which the main conveyor unit A is movable, no special compensation for the varying amounts per unit length of material on the belt of unit C, arising from the movements of the conveyor as a unit in its longitudinal direction, will be necessary if the speed of the belt of the conveyor unit C is given a suitable value. Should such compensation be deemed necessary, also the conveyor unit C may be provided with a further conveyor unit arranged above unit C in the same way as unit B is arranged above unit A. The discharge end of the main conveyor unit A at end roller 5 will then correspond, as regards this conveyor combination, to the material intake 15 above the further conveyor unit B.

I claim:

1. Apparatus for conveying particulate material to a discharge area, in particular to the mouth of an indurating furnace, at which the material shall be evenly deposited and distributed over a length or surface, comprising in combination, a first conveyor unit including a first conveyor belt and being movable back and forth as a unit in the longitudinal direction of said first conveyor belt; a second conveyor unit including a second conveyor belt located above and parallel to said first conveyor belt; a fixed means for feeding material onto said second conveyor belt; said second conveyor belt being so disposed with reference to said first conveyor belt, as to discharge material therefrom onto said first conveyor belt and said second conveyor unit being movable back and forth in the longitudinal direction of said second conveyor belt, means for driving said first conveyor belt, means for driving said second conveyor belt in an opposite direction from that of said first conveyor belt, and means for moving said second conveyor unit as a unit in the same direction as said first conveyor unit with half the velocity of the movement as a unit of said first conveyor unit.

2. Apparatus as claimed in claim 1, in which said second conveyor unit includes a belt-carrying carriage, and in which said means for driving said second conveyor belt is adapted to drive the same at a constant velocity relative to that of said belt-carrying carriage.

3. Apparatus as claimed in claim 1, in which said means for driving said second conveyor belt is adapted to drive the same at a constant velocity relative to that of said fixed means for feeding material onto said second conveyor belt.

4. Apparatus as claimed in claim 1, wherein said first conveyor unit includes a conveyor belt-carrying carriage and rails supported on said carriage, and wherein said second conveyor unit is movable in the longitudinal direction of said second conveyor belt on said rails.

5. Apparatus as claimed in claim 1, wherein said second conveyor unit is coupled to said first conveyor unit by means of a rope transmission comprising ropes, one end of each of which ropes is secured to said movable first conveyor unit and the other end of each of which is fixedly secured, said ropes running over rope pulleys rotatably attached to said second conveyor unit, whereby said second conveyor unit is moved as a unit in the same direction as said first conveyor unit with half the velocity of the movement as a unit of said first conveyor unit.

References Cited in the file of this patent

UNITED STATES PATENTS

| | | |
|---|---|---|
| 2,479,823 | Ernst | Aug. 23, 1949 |
| 2,834,484 | DeVaney et al. | May 13, 1958 |